George F. Feldbauer Jr.
Charles E. Jahnig
Homer Z. Martin   Inventors
By  Attorney Patented Aug. 10, 1954

2,686,151

UNITED STATES PATENT OFFICE 2,686,151

RECOVERY OF HYDROGEN FLUORIDE FROM THE REGENERATION GASES OF A CATALYTIC CRACKING PROCESS

George F. Feldbauer, Jr., Cranford, Charles E. Jahnig, Red Bank, and Homer Z. Martin, Cranford, N. J., assignors to Standard Oil Development Company, a corporation of Delaware Application December 16, 1950, Serial No. 201,222

10 Claims. (Cl. 196—52)

This invention pertains to the catalytic conversion of petroleum hydrocarbons and particularly to the catalytic cracking of hydrocarbon oils boiling in the gas oil range to form motor fuels or gasoline.

It has recently been found that worthwhile improvements in product distribution may be obtained in the catalytic cracking of hydrocarbon oils in the presence of conventional cracking catalysts such as clay, silica-alumina, or silica-alumina-magnesia gel type compositions if small amounts of hydrogen fluoride or an active fluoride compound is provided in the reaction system. It has been proposed, for example, to treat synthetic gel catalysts that have suffered a loss in activity and/or selectivity with aqueous solutions of hydrofluoric acid or of ammonium fluoride or with mixtures of hydrofluoric acid with lesser amounts of other acids such as hydrochloric or acetic acids or acid solutions to which certain aluminum salts have been added or with weak solutions of hydrofluosilicic acid containing an aluminum salt. It has also been proposed to treat used cracking catalysts with gaseous hydrogen fluoride at various points in the reactor system, to wit, in admixture with stripping steam, in the spent catalyst standpipe and in the regenerated catalyst standpipe. It has also been proposed to treat only the catalyst fines recovered from regeneration gases with hydrogen fluoride, preparatory to recycling in the reactor system.

While these expedients have been effective in improving product distribution and maintaining catalyst activity and selectivity they have created a number of problems that must be solved before they may be applied in commercial operations. The chief difficulty arises from the fact that the stack or flue gases from the regenerator of a full scale cracking plant using a fluoride-containing catalyst would contain more hydrogen fluoride than could be safely discharged into the atmosphere. The concentration of fluoride in these exit gases has been found to increase with temperature and steam partial pressure. The loss of fluoride in the flue gases and product gases would also be a serious economic factor because while the concentration of hydrogen fluoride is relatively small, the total quantity lost in a day is quite large due to the large gas volumes involved.

It is the object of this invention to provide a method for the removal of fluorides from product vapors or from the flue gases of the regenerator of a catalytic cracking reactor system in which fluoride compounds such as HF, $SiF_4$, $AlF_3$, etc. are utilized as activators or agents for improving product distribution and/or for maintaining catalyst activity and selectivity.

It is a further object of this invention to provide a method for the removal of fluorides from the product vapors or from the regenerator flue gases of a catalytic cracking reactor system using a fluoride-containing catalyst in such a way that the fluorides may be recovered and made available for reuse in the cracking process.

These and other objects will appear more clearly from the detailed specification and claims which follow.

It has now been found that fluorides may be removed from gaseous mixtures such as the product vapors or regenerator flue gases from cracking plants using a fluoride-containing catalyst by contacting them with an adsorbent such as lime or limestone, alumina or a synthetic gel cracking catalyst such as a silica-alumina or silica-alumina-magnesia cogel under controlled temperature conditions to adsorb the fluoride, recovering and recycling fluoride-containing adsorbent that is produced or treating the fluoride-containing adsorbent to regenerate hydrogen fluoride for reuse in the process.

Contact of the fluoride-containing gaseous stream and the adsorbent can be effected by passing the gaseous stream through a fixed bed or beds of the adsorbent in a tower or by contacting the gaseous stream with the adsorbent in finely divided condition in accordance with the fluidized solids technique. For example, the adsorbent in finely divided condition may be incorporated in the gaseous stream and passed concurrently therewith through an adsorption zone and thence to a separation zone such as an electrical precipitator, a cyclone separator or the like or the gaseous stream and adsorbent solid may be supplied continuously to a contacting vessel wherein a dense fluidized bed of solid adsorbent particles is maintained from which a stream of solid particles is withdrawn for processing for the recovery of fluoride.

The temperature maintained during the adsorption of fluoride from the process gases may vary over a substantial range, for example, between about 200 and about 900° F. when using the fluid solids technique. The temperature should be high enough to prevent plugging or "mudding" due to excessive condensation.

Suitable adsorbents for the fluoride include lime or limestone, magnesia or magnesium carbonate or a mixture of calcium and magnesium carbonate as in dolomitic limestone or a mixture of calcium and magnesium oxides as obtained by the calcination of dolomitic limestone, alumina or synthetic gel cracking catalysts, such as, silica-alumina, silica-magnesia or silica-alumina-magnesia cogels. With chemical adsorbents, the amount of adsorbent used should be at least equal to that stoichiometrically required for complete conversion of all the fluoride in the gas to aluminum, calcium or magnesium fluoride, but it should be understood that substantially larger amounts may be used if desired to increase the HF recovery. With adsorbents such as silica-alumina, etc. it has been found preferable to hold a maximum of about 5% HF on catalyst in contact with the vapors leaving the adsorber.

The aluminum, calcium or magnesium fluoride formed in the adsorption step may be reused as formed or treated batch-wise or continuously to reform hydrogen fluoride for reuse in the cracking process. Decomposition of the aluminum, calcium or magnesium fluoride may be effected by contacting with steam at temperatures of at least 1000° F., for example, at temperatures of about 1100° F. to about 1300° F. Removal of fluoride is favored by high steam partial pressure. The hydrogen fluoride steam mixture may be recycled directly as formed or it may, if desired, be condensed, concentrated or purified, and stored for reuse as needed. Alternate methods of regenerating the hydrogen fluoride may be desirable especially in the case of calcium fluoride since it is more difficult to decompose. For example, the fluoride may be treated with $H_2SO_4$, or it may be steamed in the presence of sand or silica to form hydrogen fluoride according to the equation.

$$CaF_2 + SiO_2 + H_2O \rightarrow CaSiO_3 + 2HF$$

When cracking catalyst is used as the adsorbent it may be recycled to the cracking zone as formed. When lime or limestone is used, the adsorbent may be agitated to remove solid fluoride from the surface of the particles whereupon the solid fluoride particles may be introduced directly into the cracking reactor or processed for fluoride recovery, while the residual limestone may be recycled to the adsorption step.

The accompanying drawing illustrates, diagrammatically, several embodiments of the present invention.

Figure 1:
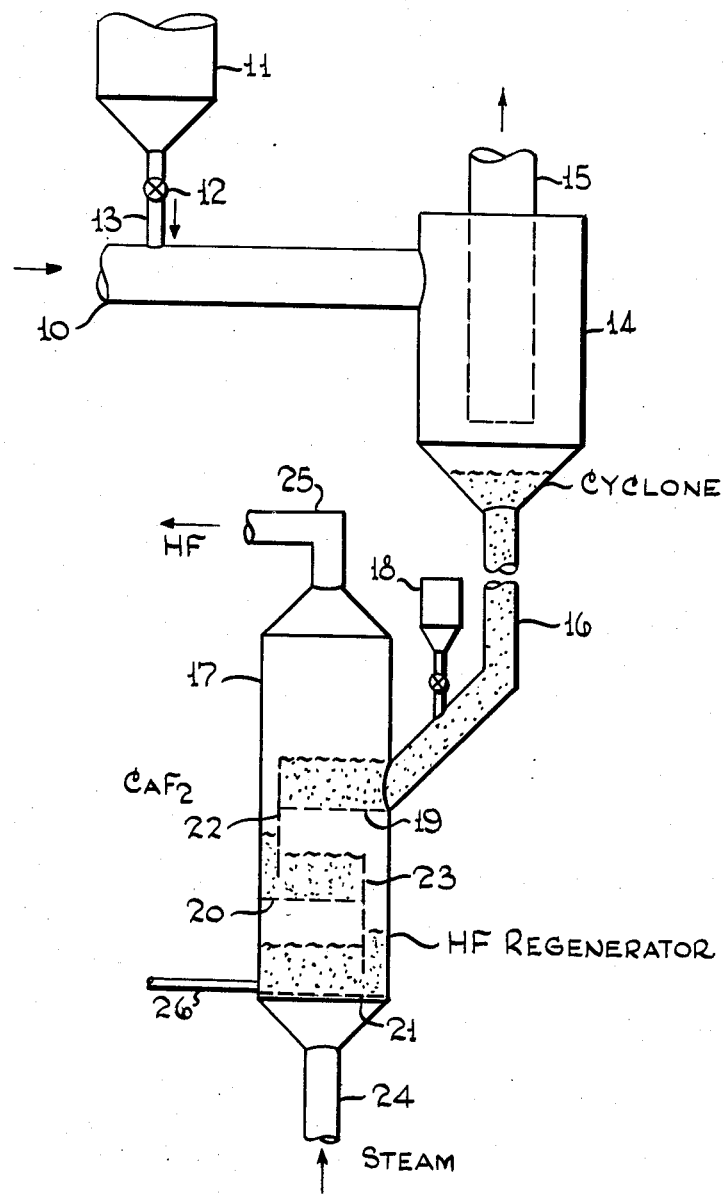
Fig. 1 illustrates the recovery of hydrogen fluoride from flue gas using lime as the adsorbent and steaming the calcium fluoride formed to regenerate hydrogen fluoride.

Referring to Fig. 1, 10 is a conduit or flue receiving gases released during the regeneration of a cracking catalyst by the burning of inactivating carbonaceous deposits. The regeneration gases are passed through cyclone separators or the like to remove as much of the entrained catalyst particles as is possible by such means and then, if desired, the regeneration gases are passed through a Cottrell or electrical precipitator prior to their arrival at the point illustrated in the drawings. Moreover, if the temperature of the regeneration gases arriving at this point is too high, suitable heat exchanger means may be incorporated in the line to adjust the temperature of the gas to the desired range.

11 is a storage hopper for adsorbent lime or limestone which is introduced into line 10 through control valve 12 and line 13. The mixture of adsorbent and regeneration gases is discharged into a cyclone or centrifugal separator 14 or the like. In order to increase turbulence and promote better contacting of gas and solids in conduit 10, a venturi or baffles may be used if desired. When necessary, additional contacting time can be obtained by providing an enlarged zone in conduit 10.

The treated gas is discharged overhead from separator 14 through conduit 15 while the solid particles drop to the bottom of separator 14 and are withdrawn through conduit 16 and discharged into the hydrogen fluoride regenerator 17. A hopper 18 is preferably provided for storage of silica or sand for supply to conduit 16 where it is mixed with the calcium fluoride to facilitate regeneration of hydrogen fluoride. Several perforated plates 19, 20 and 21 are arranged in vertically spaced relation within the regenerator vessel 17, with conventional downcomers 22 and 23 for conveying catalyst from plate 19 to plate 20 and from plate 20 to plate 21 respectively. Steam is introduced below the lowermost plate 21 through inlet line 24 and passes upwardly through the perforations and through the bed of solid particles which accumulates on each of the plates decomposing the calcium or magnesium fluoride, the hydrogen fluoride formed and a stream of steam being taken overhead through discharge line 25. The downcomers permit the solid particles to pass to the successive plates countercurrently to the ascending steam and a discharge line 26 is provided to permit withdrawal of solid particles from the lowermost plate. Weir members may be provided at the inlet to each downcomer to maintain a certain minimum depth of solid particles on each plate. The solid particles withdrawn at 26 may be recycled, if desired, to hopper 11 and reused in the process or they may be discarded. The hydrogen fluoride and steam mixture withdrawn through line 25 may be reused directly in the cracking operation by introducing it into the stripping section of a bottom drawoff fluid catalyst cracking reactor or by utilizing it as the fluidizing medium in the spent catalyst standpipe or in the regenerated catalyst standpipe. In general, stripping with steam to be subsequently used in the process provides a convenient efficient means for recovering the HF.

Figure 2:
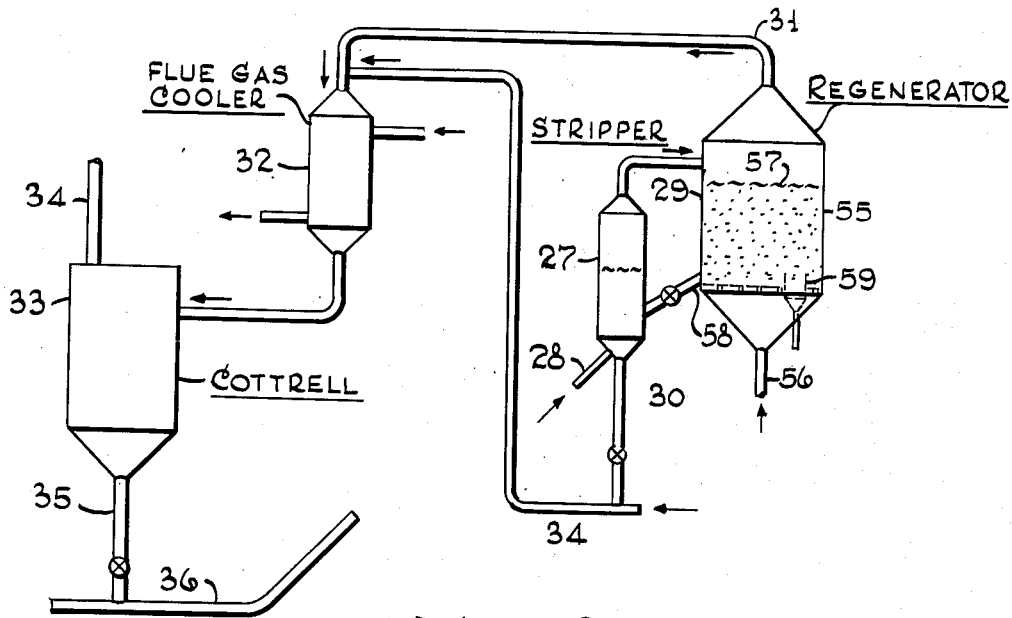
Fig. 2 illustrates the recovery of hydrogen fluoride from flue gas using a side stream of regenerated catalyst as the adsorbent.

In Fig. 2. 55 is a regenerator to which spent catalyst and air are supplied continuously through supply line 56, in order to burn off carbonaceous deposits. A dense fluidized bed of catalyst is maintained in the lower portion of the vessel 55, the bed having a level 57. Outlet line 58 is provided below the surface of the bed so as to permit the withdrawal of a side stream of regenerated catalyst directly from the dense bed. An outlet 59 is provided for the withdrawal of a stream of regenerated catalyst particles for recycling to the main reactor. The side stream of regenerated catalyst is discharged from line 58 into stripper vessel 27 where HF and fines content may be reduced. Steam or air is introduced into the bottom of stripper 27 through inlet line 28. Stripping vapors are taken overhead from the stripper and passed through line 29 into the upper part of the regenerator 55.

Stripped regenerated catalyst is removed from the bottom of stripper 27 through line 30.

Flue gas from regenerator 55 is taken overhead through cyclone separators or the like (not shown) and thence through line 31, flue gas cooler 32 to Cottrell precipitator 33. The stripped regenerated catalyst may be discharged from conduit 30 into line 34 and conveyed by means of a stream of air or the like to the inlet to flue gas cooler 32 where it may be discharged into the stream of flue gas. Alternatively the regenerated catalyst particles may be cooled separately and then discharged directly into the inlet of Cottrell precipitator 33. Contact of the flue gases with freshly regenerated catalyst may be at a temperature below about 600° F. in the Cottrell or in the flue gas cooler and the Cottrell. After contacting, the fluoride content of the flue gas is reduced to such a point that the flue gas may be discharged to the atmosphere through stack 34. The fluoride-containing catalyst particles are withdrawn from the bottom of the Cottrell through line 35 and discharged into line 36 in which it may be conveyed by means of a stream of hydrocarbon vapors to a hydrocarbon conversion reactor or by a stream of air or steam to the regenerator or to a suitable hydrogen fluoride regenerator where it may be contacted with steam at elevated temperatures to reform hydrogen fluoride.

Figure 3:
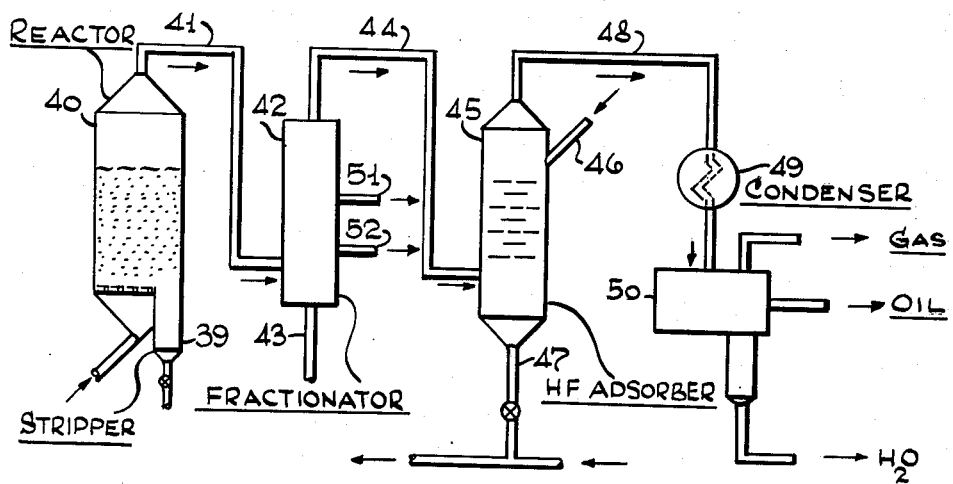
Fig. 3 illustrates the recovery of hydrogen fluoride from the stream of cracked hydrocarbon products.

Fig. 3 illustrates the recovery of fluoride on the oil side using a stream of circulating catalyst as the adsorbent. In Fig. 3, 40 is a reactor, preferably a fluidized solids reactor of the dense bed, bottom draw-off type, while 41 is the line through which reaction product vapors are withdrawn after passage through cyclone separators or the like arranged inside the upper part of the reactor. The product vapors are discharged into fractionator 42 to separate heavy oil which is removed through line 43 and, if desired recycled to the cracking zone. Products such as heating oil and heavy gas oil can be taken off as side-streams at points 51 and 62. The lighter reaction products are taken overhead from fractionator 42 through line 44 and discharged into hydrogen fluoride adsorption vessel 45. Fresh catalyst or freshly regenerated catalyst is introduced into the adsorber 45 through line 46. In many cases, it will be desirable to provide solids for the adsorber by drawing off a stream of circulating catalyst through stripper 39 on the bottom of reactor 40. Contact with steam in this stripper reduces the HF on catalyst and makes it suitable for use. Preferably a separate stripping zone is used, permitting a high steam rate.

Suitable baffles such as disc and donut or side to side baffles, or contacting plates, can be provided in the adsorber in order to improve contact of the solid particles and the product vapors. The temperature in adsorber 45 is maintained sufficiently high to prevent excessive condensation from occurring so that dry catalyst particles containing adsorbed hydrogen fluoride may be withdrawn from the bottom of adsorber 45 through line 47 and passed to the cracking section or to a hydrogen fluoride regenerator where the catalyst is treated with steam at elevated temperatures. The temperature in adsorber 45 can be regulated by adjusting the temperature of entering solids or gases, or internal heating coils may be provided. The cracked product vapors substantially free of fluorides are taken overhead from adsorber 45 through line 48 and passed to condenser 49 from which the product is discharged into separator 50 for the separation of liquid product from uncondensed gases. These streams are further processed according to conventional methods.

Instead of using a fluid or moving bed adsorber several fixed bed adsorbers having heat transfer coils embedded in the adsorbent bed may be utilized. By using several vessels cyclically it is possible to have one vessel on stream while a second is being stripped and a third is being cooled preparatory to being placed back on stream. In this case the hydrogen fluoride is preferably recovered by stripping with process steam (i. e. injector or stripping steam) and provision is made for heating the adsorbent to higher temperatures to facilitate stripping. The adsorbent is then cooled and is ready for reuse.

The following data are illustrative of the results that can be obtained in accordance with the present invention.

A silica-alumina cracking catalyst containing small amounts of hydrogen fluoride was contacted with process gas containing small amounts of hydrogen fluoride and steam at elevated temperatures. The conditions maintained in a run at 500 and another at 1050° F. are tabulated below:

| | 500 | 1,050 |
|---|---|---|
| Temperature, °F | | |
| Inlet Gas: | | |
| Vol. Percent HF | 0.15 | 0.17 |
| Vol. Percent Steam | 27 | 25 |
| Feed Rate, Cu. F./Hr./Cu. Ft. cat | 720 | 720 |
| Percent HF on Catalyst: | | |
| Start | 0.55 | 0.55 |
| Finish | 1.58 | 1.26 |
| HF Recovery, Percent | 74 | 52 |

It may be seen from this data that even at high temperatures and at relatively high steam partial pressures a substantial recovery of HF is achieved. Higher recovery could be obtained by providing more contact time between gas and solid.

Although the above description has been made in terms of fluoride recovery, it should be understood that its use with similar or equivalent treating agents is contemplated. For example, borates and particularly boric acid have been used for treating contaminated cracking catalysts to improve selectivity. Moreover, boria is volatile in the presence of steam and is carried out of the cracking system by the effluent gases and vapors. The present invention shows how this boria can be recovered by cooling the vapors leaving the reactor or regenerator and contacting with an adsorbent material such as silica, cracking catalyst, char, etc. Boria may then be recovered from the adsorbent by heating and stripping, or the adsorbent may be returned directly to the cracking system.

It will be seen that the invention can be used to advantage in processes other than catalytic cracking. In isomerization using aluminum chloride type catalyst, some of the aluminum chloride is carried out of the reactor with the reaction products. This can be conveniently recovered and recycled to the reactor by contacting the products with recycle or make-up catalyst. Also catalyst base material, such as high surface area silica or alumina, may be used as the adsorbent.

The foregoing description contains a limited number of embodiments of the present invention. It will be understood, however, that numerous variations are possible without departing from the scope of the following claims.

What is claimed is:

1. A process for recovering hydrogen fluoride from gases formed in the regeneration of catalysts treated with hydrogen fluoride to improve product distribution in the catalytic cracking of hydrocarbons in contact with said catalysts which comprises contacting the said regeneration gases with a solid adsorbent for the hydrogen fluoride in finely divided condition in an adsorption zone in such a ratio that the adsorbent in contact with the gases leaving the adsorption zone contains at most 5% of hydrogen fluoride, regulating the temperature of the regeneration gases so that substantially all the hydrogen fluoride is adsorbed on the solid adsorbent particles, separating the latter from the stripped regeneration gases and returning the adsorbed hydrogen fluoride to the cracking process.

2. A process for recovering hydrogen fluoride from gases formed in the regeneration of catalysts treated with hydrogen fluoride to improve product distribution in the catalytic cracking of hydrocarbons in contact with said catalysts which comprises contacting the said regeneration gases with a solid adsorbent for the hydrogen fluoride in finely divided condition in an adsorption zone in such a ratio that the adsorbent in contact with the gases leaving the adsorption zone contains at most 5% of hydrogen fluoride, regulating the temperature of the regeneration gases so that substantially all the hydrogen fluoride is adsorbed on the solid adsorbent particles, separating the latter from the stripped regeneration gases, treating the fluoride-containing adsorbent with steam at elevated temperatures to release hydrogen fluoride from the adsorbent and recycling the regenerated hydrogen fluoride to the cracking operation.

3. A process for recovering hydrogen fluoride from gases formed in the regeneration of catalysts treated with hydrogen fluoride to improve product distribution in the catalytic cracking of hydrocarbons in contact with said catalysts which comprises contacting the said regeneration gases with solid cracking catalyst particles in finely divided condition in an adsorption zone in such a ratio that the adsorbent in contact with the gases leaving the adsorption zone contains at most 5% of hydrogen fluoride, regulating the temperature of the regeneration gases so that substantially all the hydrogen fluoride is adsorbed on the solid catalyst particles, separating the latter from the stripped regeneration gases and returning the catalyst particles containing adsorbed hydrogen fluoride to the cracking process.

4. A process for recovering hydrogen fluoride from gases formed in the regeneration of catalysts treated with hydrogen fluoride to improve product distribution in the catalytic cracking of hydrocarbons in contact with said catalysts which comprises contacting the said regeneration gases with solid cracking catalyst particles in finely divided condition in an adsorption zone in such a ratio that the adsorbent in contact with the gases leaving the adsorption zone contains at most 5% of hydrogen fluoride, regulating the temperature of the regeneration gases so that substantially all the hydrogen fluoride is adsorbed on the solid catalyst particles, separating the latter from the stripped regeneration gases, contacting the catalyst particles containing adsorbed hydrogen fluoride with steam to strip off hydrogen fluoride and recycling the regenerated hydrogen fluoride to the cracking reaction zone.

5. The process as defined in claim 2 wherein the adsorbent is lime or limestone and silica is added to the fluoride-containing adsorbent to facilitate the regeneration of hydrogen fluoride by steaming of said adsorbent.

6. In a process wherein a hydrocarbon feed is cracked in a conversion zone in the presence of a dense turbulent bed of a finely divided fluoride-containing solid cracking catalyst, a vapor stream containing cracked hydrocarbon product and hydrogen fluoride is recovered therefrom, coke-deactivated catalyst is withdrawn from the conversion zone and regenerated in an oxygen-containing combustion zone where it is maintained as a dense turbulent bed while the coke is burned off, regeneration gases containing hydrogen fluoride are withdrawn from the combustion zone and regenerated catalyst is recycled to the conversion zone, the improvement which comprises mixing the hydrogen fluoride-containing regeneration gases with a solid adsorbent at a temperature between 200 and 900° F. in an adsorption zone to adsorb the hydrogen fluoride, separating and recovering hydrogen fluoride-containing adsorbent from the adsorption zone before the hydrogen fluoride content of the adsorbent in contact with the gas leaving the adsorption zone exceeds 5%, and returning the recovered hydrogen fluoride to the conversion zone.

7. A process according to claim 6 wherein the catalyst is an adsorbent silica-alumina composite gel and comprising the steps of withdrawing a side stream of the catalyst from the dense bed of the combustion zone, cooling the withdrawn catalyst to a temperature below 600° F., mixing it in an adsorption zone at a temperature below 600° F. with the hydrogen fluoride-containing regeneration gases separately withdrawn from the combustion zone, keeping the regeneration gases and adsorbent catalyst in contact until substantially all the hydrogen fluoride of the regeneration gases is adsorbed on the catalyst, and returning the hydrogen fluoride-containing catalyst to the conversion zone.

8. A process according to claim 6 wherein the hydrogen fluoride-containing regeneration gas is mixed with an adsorbent consisting essentially of fresh silica-alumina cracking catalyst and wherein the resulting hydrogen fluoride-containing catalyst is introduced into the conversion zone.

9. In a process according to claim 6 wherein the adsorbent contains lime, the further improvement which comprises mixing the hydrogen fluoride-containing adsorbent from the adsorption zone with silica, steaming the resulting mixture at elevated temperature to liberate hydrogen fluoride therefrom, and recycling the liberated hydrogen fluoride to the conversion zone.

10. A process according to claim 6 wherein the vapor product stream recovered from the conversion zone is also passed to an adsorption zone where it is contacted with a solid adsorbent to adsorb hydrogen fluoride from the hydrocarbon vapors, the ratio of adsorbent to vapors in this adsorption zone being sufficient to keep the fluoride content of the adsorbent in contact with the vapors leaving the adsorption zone below 5%.

References Cited in the file of this patent

UNITED STATES PATENTS

| Number | Name | Date |
| --- | --- | --- |
| 2,481,208 | Eberle | Sept. 6, 1949 |
| 2,525,812 | Lien et al. | Oct. 17, 1950 |
| 2,558,375 | Olson | June 26, 1951 |